Figure 1:
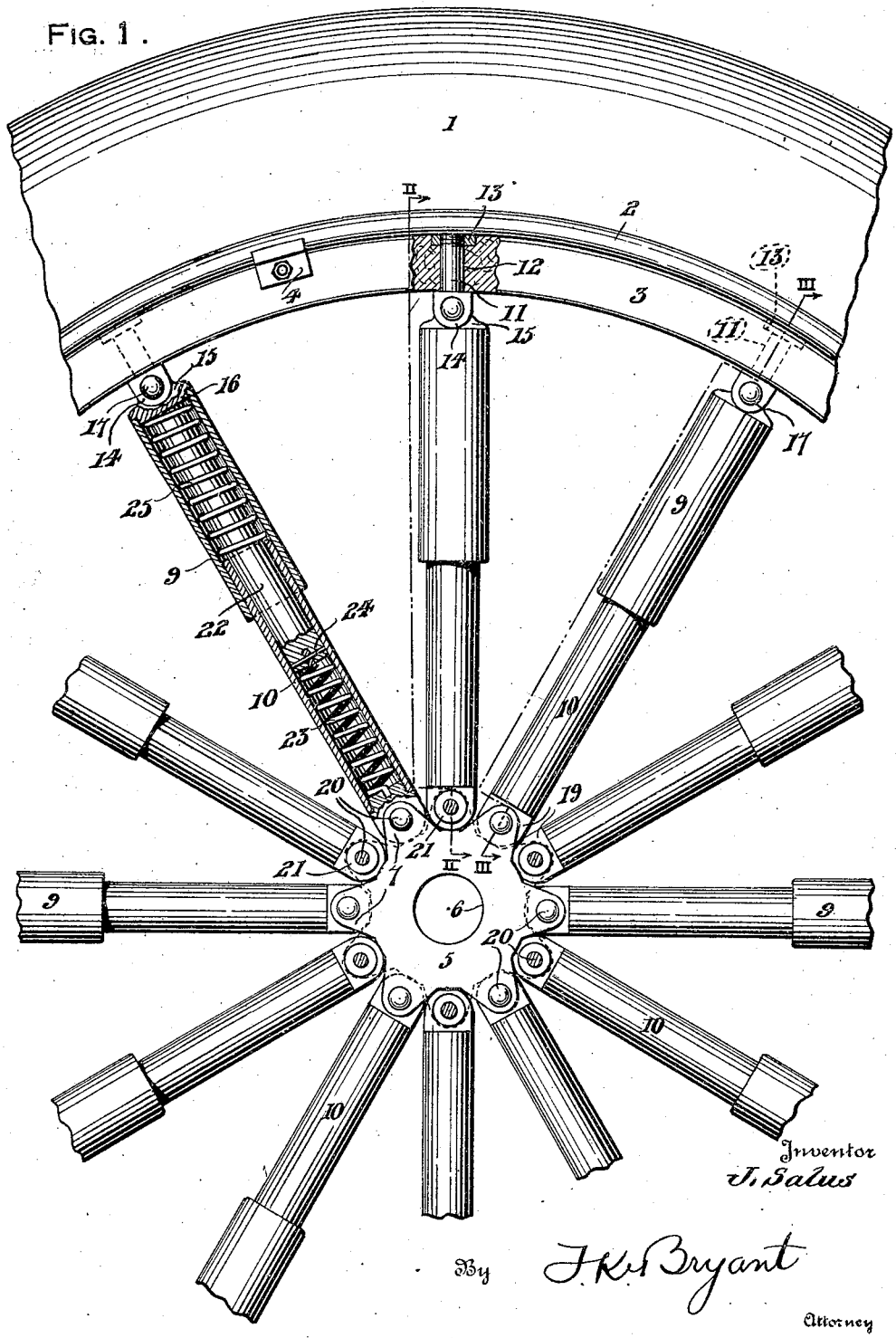

Feb. 27, 1923.

J. SALUS.
VEHICLE WHEEL.
FILED JUNE 14, 1921.

1,446,932.

2 SHEETS—SHEET 1.

Feb. 27, 1923.
J. SALUS.
VEHICLE WHEEL.
FILED JUNE 14, 1921.
1,446,932.
2 SHEETS—SHEET 2.
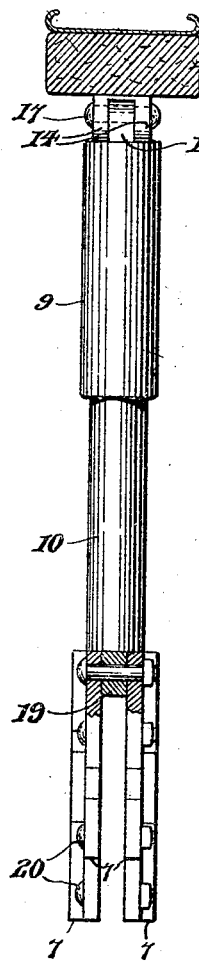
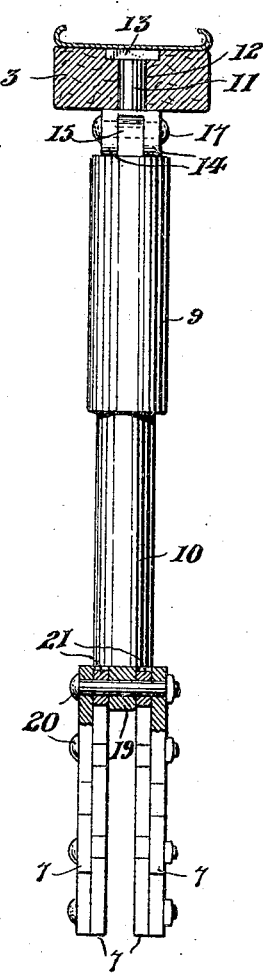
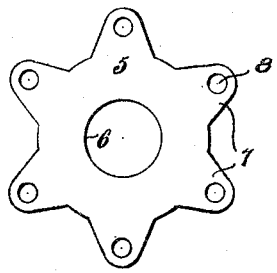
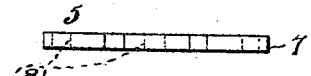
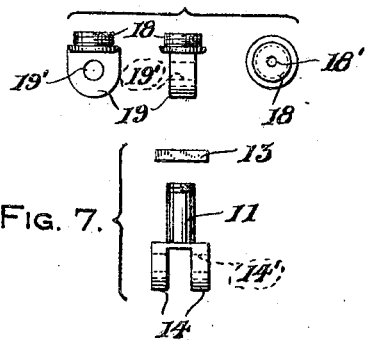
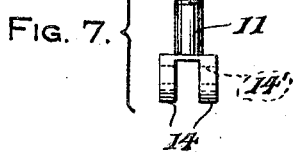
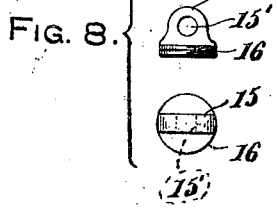
Inventor
J. Salus
By F. K. Bryant
Attorney Patented Feb. 27, 1923.

1,446,932

UNITED STATES PATENT OFFICE.

JOSEPH SALUS, OF ST. PAUL, MINNESOTA.

VEHICLE WHEEL.

Application filed June 14, 1921. Serial No. 477,434.

*To all whom it may concern:*

Be it known that I, JOSEPH SALUS, a citizen of the United States of America, residing at St. Paul, in the county of Ramsey and State of Minnesota, have invented certain new and useful Improvements in Vehicle Wheels, of which the following is a specification.

This invention relates to certain new and useful improvements in vehicle wheels and has particular reference to a wheel especially designed for automobiles wherein the rim portion thereof carries the usual pneumatic or cushion tire with tensioned spokes connecting the rim to the wheel hub.

The primary object of the invention resides in the provision of a vehicle wheel of the automobile type wherein cushion springs are associated with telescoping spoke members with novel devices connecting the opposite ends of the spoke members to the wheel hub and rim.

With the above general objects in view and others that will appear as the nature of the invention is better understood, the same consists in the novel form, combination and arrangement of parts hereinafter more fully described, shown in the accompanying drawing and claimed.

In the drawing, wherein like reference characters designate corresponding parts throughout the several views, Figure 1 is a fragmentary side elevational view, partly in section of an automobile wheel constructed in accordance with the present invention, Figure 2 is a sectional view taken on line II—II of Fig. 1 showing the connection between the inner end of a spoke and adjacent hub plates, Figure 3 is a sectional view taken on line III—III of Fig. 1 showing the connection between the inner end of a spoke and the spaced hub plates, Figure 4 is a side elevational view of one of the hub plates showing the star points providing the mounting for the inner ends of the spokes, Figure 5 is an edge view of the same, Figure 6 shows side, edge and bottom plan views of the screw block connected to the inner end of the spoke, Figure 7 shows side elevational views of the anchoring bolt and nut for securing the outer end of the spoke to the wheel rim, and Figure 8 shows side, edge and top plan views of the screw block for securing the outer end of the spoke to the anchoring bolt and nut.

Referring more in detail to the accompanying drawings and particularly to Fig. 1 there is illustrated an automobile wheel embodying a tire section 1 carried by a rim 2 secured to the felly 3 by the clamping plates 4.

The wheel hub embodies four plates 5 having central axial receiving openings 6 and radial star points 7 provided with bolt receiving openings 8, the outer plates 5 as shown in Fig. 3 having the star points 7 transversely alined while the intermediate inner hub plates 5 have the star points 7 alined at the spaces between the star points of the outer plates as shown in Fig. 2 so that the inner ends of the spokes will be secured to the hub in a direct circumferential line.

Each spoke embodies an outer tubular section 9 and an inner tubular section 10 telescoping therein, the outer end of the tubular spoke section 9 and the inner end of the tubular spoke section 10 being secured respectively to the felly 3 and the hub plates 5. The connection between the outer tubular section 9 and the felly 3 embodies a screw bolt 11 passed through a radial opening 12 in the felly with the nut 13 threaded upon the outer end of the bolt 12 and countersunk within the felly as shown in Fig. 1. The inner end of the bolt 11 is provided with an enlarged portion that is bifurcated to provide side arms 14 between which the flange 15 upon the screw plug 16 is received, the arms 14 and flange 15 being provided with registering openings 14′ and 15′ respectively for receiving the pivot pin 17. The screw plug 16 is threaded into the outer end of the tubular spoke section 9 as shown in Fig. 1.

The connection between the inner end of the tubular spoke section 10 and the hub plates 5 includes a threaded plug 18 having a flange 19 upon one face thereof provided with an aperture 19′, the plug 18 being threaded into the inner end of the tubular spoke section 10 with a pin 20 passed through each of the openings 8 in transversely alined star points 7 of the plates 5 pivotally received in the opening 19′ in the plug flange 19. The inner end of one tubular spoke section 10 is supported on a pin 20 that is mounted in the outwardly positioned plates 5 as shown in Fig. 3 and to properly position the inner end of the spoke, spacing collars 21 are mounted on the pin between the plug flange 19 and the outer plates 5. The adjacent spoke is supported on a pin 20 in star points 7 of the inwardly positioned adjacent hub plates 5, the flange 19 of the screw plug 18 engaging at its opposite sides the adjacent hub plates 5 without the necessity of providing additional spacing collars. The advantages of providing a wheel hub constructed as above described will be readily apparent. The embodiment of the four plates having the star points 7 not only provides for substantially reinforcing the wheel hub but each alternate spoke 10, constituting in reality one series of spokes, is adapted to be pivotally engaged with the inner plates while the adjacent spokes are adapted to be pivotally engaged with the outer plates. It will thus be seen that the strain of the spokes 10 will be evenly distributed upon the four plates.

The cushion elements associated with each spoke embody a plunger rod 22 slidable within the inner tubular spoke section 10 and extending into the outer spoke section 9 for engagement with the inner face of the screw plug 16, a coil spring 23 disposed in the inner tubular spoke section 10 having its inner end anchored in the axial opening 18' in the outer face of the screw plug 18 while the outer end of the spring 23 extends into a terminal opening in the inner end of the plunger rod 22 and is there secured by the cross pin 24. A coil spring 25 surrounds the plunger rod 22, the same engaging at its inner end, the outer end of the inner tubular spoke section 10 and at its outer end the screw plug 16.

It will, therefore, be seen that the plunger rod 22 provides a guide for the telescoping tubular spoke sections 9 and 10 and an attachment for the cushion spring 23, while the tubular spoke sections are further maintained in resilient association by the coil spring 25 interposed between the block 16 and the inner spoke section 10. Also, the particular arrangement of the hub plates 5 provides for the circumferential alinement of the inner ends of the spokes, while each spoke is pivotally supported at its inner and outer end upon the hub and felly respectively.

While there is herein shown and described the preferred embodiment of the present invention, it is nevertheless to be understood that minor changes may be made therein without departing from the spirit and scope of the invention as claimed.

What is claimed as new is:—

1. In a vehicle wheel, a hub comprising a pair of inner and outer star-shaped plates, the points of the inner plates being transversely alined, and the points of the outer plates being transversely alined and arranged in staggered relation in respect to the points of the inner plates.

2. In a vehicle wheel having spokes connecting the hub and felly, a hub comprising a pair of inner and outer star-shaped plates, the points of the inner plates being transversely alined, and the points of the outer plates being transversely alined and arranged in staggered relation in respect to the points of the inner plates, and means for connecting the spokes to the said hub, said means including pivotal connections between the spokes and the points of the respective pairs of star-shaped plates.

3. In a vehicle wheel having spokes connecting the hub and felly, a hub comprising a pair of inner and outer star-shaped plates, the points of the inner plates being transversely alined, and the points of the outer plates being transversely alined and arranged in staggered relation in respect to the points of the inner plates, and means for connecting the spokes to the hub, said means including pivotal connections between the spokes and the points of the respective pairs of star-shaped plates, said connections comprising blocks secured to the inner ends of the spokes, pivot pins connecting the blocks to the alined points of the star-shaped plates, and spacing collars supported on said pins between the outer plates and the blocks.

In testimony whereof I affix my signature.

JOSEPH SALUS.